United States Patent [19]
Wingblad et al.

[11] Patent Number: 5,964,442
[45] Date of Patent: Oct. 12, 1999

[54] VEHICLE SEAT ADJUSTER WITH SELF COMPENSATING CROSS WIRE LENGTH

[75] Inventors: Glen Daniel Wingblad, Wixom; Gary Paul Parko, Clinton Township; Robert Paul Adams, Macomb, all of Mich.

[73] Assignee: Lear Corporation, Southfield, Mich.

[21] Appl. No.: 08/816,753

[22] Filed: Mar. 3, 1997

[51] Int. Cl.⁶ .................................................. F16M 13/00
[52] U.S. Cl. ........................... 248/429; 248/424; 297/341
[58] Field of Search ................................... 248/429, 424, 248/430; 297/341

[56] References Cited

U.S. PATENT DOCUMENTS

| | | | |
|---|---|---|---|
| 3,469,812 | 9/1969 | Wonell et al. | 248/430 |
| 3,811,726 | 5/1974 | Muraishi et al. | 297/341 |
| 3,940,182 | 2/1976 | Tamura | 297/341 |
| 4,101,169 | 7/1978 | Muraishi et al. | 297/341 |
| 4,449,752 | 5/1984 | Yasumatsu et al. | 297/341 |
| 4,629,254 | 12/1986 | Stopler et al. | 297/473 |
| 4,852,846 | 8/1989 | Weier | 248/430 |
| 4,927,110 | 5/1990 | Tsumura et al. | 248/430 |
| 4,958,799 | 9/1990 | Clauw et al. | 248/430 |

*Primary Examiner*—Derek J. Berger
*Assistant Examiner*—Kimberly Wood
*Attorney, Agent, or Firm*—Brooks & Kushman PC

[57] ABSTRACT

A cross wire linked between master and slave lock bars of a vehicle seat adjuster assembly has a normally fixed length, but can lengthen when needed to accommodate a wide build condition of the parallel seat tracks. The fixed length of the cross wire is set so as to accommodate every condition but for master lock bar opening at wide build, when the slave lock bar will fully open before the master lock bar has fully opened. At that point, and only at that point, a central, integral coil spring in the cross bar, which is preloaded to match the fully open return spring force of the slave lock bar, stretches and allows the whole cross wire to effectively lengthen. The master lock bar can then be fully opened without overstressing the wire.

3 Claims, 3 Drawing Sheets

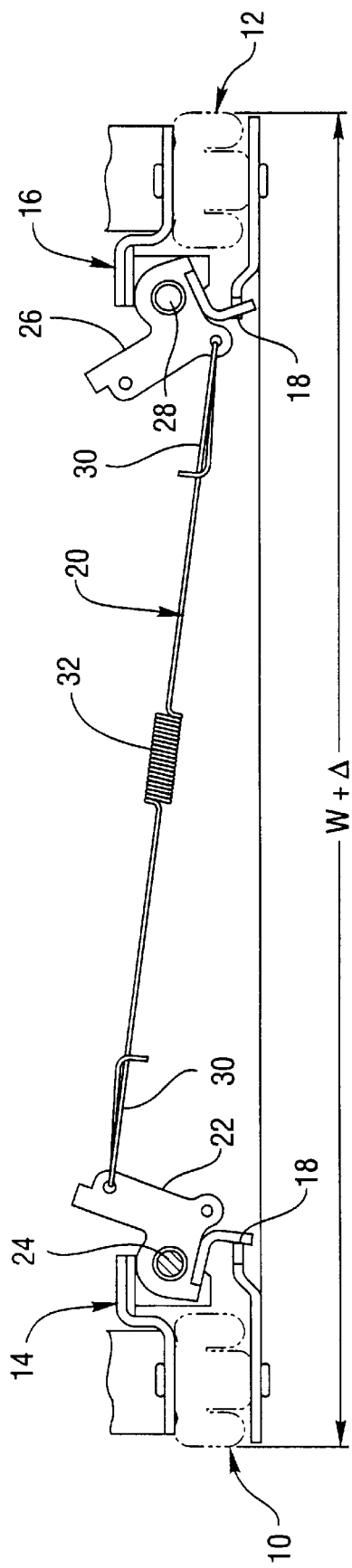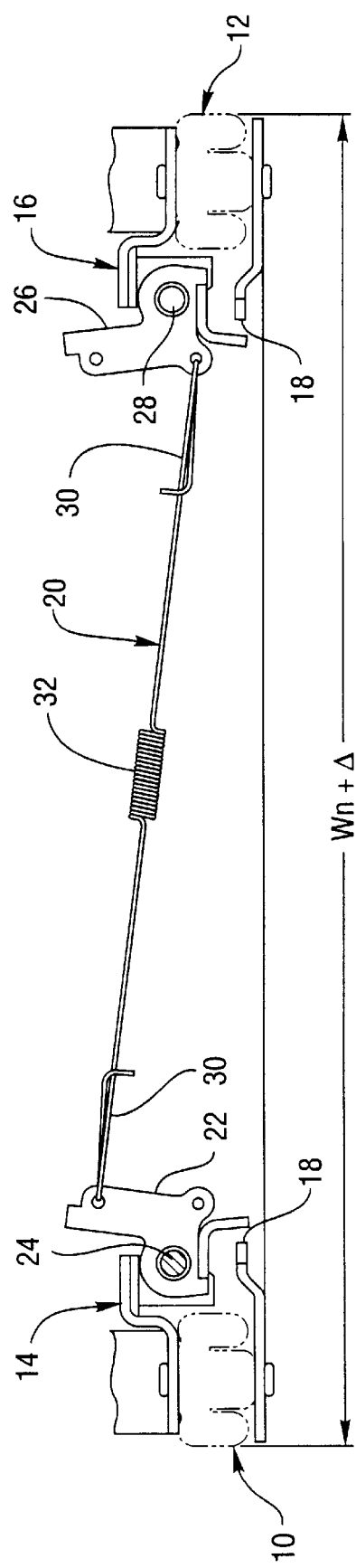

VEHICLE SEAT ADJUSTER WITH SELF COMPENSATING CROSS WIRE LENGTH

TECHNICAL FIELD

This invention relates to vehicle seat adjuster assembly, and specifically to an adjuster assembly in which the cross wire that links the master and slave lock bars of the adjuster mechanism can change its length to compensate for manufacturing tolerance variations in the spacing of the parallel seat tracks.

BACKGROUND OF THE INVENTION

Fore and aft seat adjusters for vehicle seats typically have a pair of parallel, floor mounted tracks that are locked to hold the seat in place, or opened to allow the seat to slide back and forth to a new position. The tracks are generally locked by a pair of rotatable lock bars, one associated with each track, which engage with a series of locking teeth under the force of a strong return spring. One lock bar, called a master lock bar, is directly operated and rotated by a manual handle, while the other, a slave lock bar, is indirectly operated in tandem with the master lock bar by a cross wire running from the master to the slave lock bar. It is important to normal adjuster operation that both lock bars remain fully closed when the handle is released, and that they both fully open when the handle is twisted.

Given a fixed cross wire length, consistent operation of the lock bars depends on holding a consistent spacing between the tracks. If the track spacing varies significantly over a manufacturing tolerance range, a dilemma is presented. If the cross wire length is tailored to the low end of the track spacing tolerance range, that is, made short enough to assure that the slave lock bar is pulled fully open when the master lock bar is opened, it may be effectively too short when the tracks are spaced farther apart. In that case, the wire may be relatively so short as to hold the slave lock bar partially open when the master lock bar is closed. A "too short" cross wire could also pull the slave lock bar open too soon, that is, before the master lock bar is fully open, thereby bottoming out and over stressing the wire. If the cross wire is instead tailored to the high end of the track spacing tolerance range, that is, made long enough to assure that the slave lock bar is fully closed when the master lock bar is closed, it may be effectively "too long" when the tracks are closer together. The slave lock bar might not fully open by the time the handle has rotated far enough to fully open the master lock bar. The seat track spacing, like any other dimension, can be carefully controlled or even redone during manufacture, so as to closely match a fixed, given cross wire length. Or, conversely, a range of various cross wire lengths could be kept on hand, and matched at assembly to each individually gauged track spacing. Either approach involves extra time, expense and, potentially, extra part inventory.

SUMMARY OF THE INVENTION

The invention provides a novel seat adjuster cross wire with an initially fixed length that is capable of stretching, but only under certain circumstances, so as to tolerate an expected tolerance range of track spacing.

In the preferred embodiment disclosed, a pair of parallel seat tracks have a spacing that varies within a predictable high and low tolerance range. The tracks are locked and released by a conventional master and slave lock bar. The master lock bar is directly rotated by a manual twist handle, and returns by a coil spring when the handle is released. The slave lock bar is similar, with a coil return spring that produces a known return force when it is fully opened. The slave lock bar is indirectly operated from the master lock bar by a novel cross wire.

The new cross wire has solid ends that hook between the two lock bars, but is not a straight wire all the way across. Instead, an integral coil spring sits at the center of the cross wire, twisted tightly down with a preload so that the coils are abutted or "solid", giving it and the whole cross wire a fixed length during normal operation. The tight, solid coil allows the cross wire to operate as a straight, conventional cross wire, so long as the tension in the wire does not exceed the preload threshold of the center coil. The preload or threshold coil force is set so as to be substantially equal to, or just less than, the known, fully open return force of the slave lock bar. The nominal or unstretched length of the cross wire is set so as to be long enough, when the tracks are at the high end of the track spacing tolerance range, to assure that the slave lock bar is not held open. But the nominal spring length must also be sufficiently short so as to assure that the slave lock bar fully opens as the master lock bar is opened, when the tracks are at the low end of the track spacing tolerance range. As a consequence of these two requirements, the nominal cross wire length will also be short enough that, when the tracks are at the high end of the spacing tolerance range, the slave lock bar will be pulled fully open when the handle has rotated only far enough to open the master lock bar partially. This is the point when a fixed length cross wire could be overstressed, with further handle rotation. With the new cross wire, however, the preload threshold of the coil spring will be matched and exceeded at this point, allowing the previously solid coil to stretch and thereby allowing the cross wire to effectively lengthen. Then, further rotation of the handle will be able to fully open the master lock bar as the cross wire lengthens, without pulling forcefully on the already fully open slave lock bar, thereby preventing overstressing of the cross wire.

BRIEF DESCRIPTION OF THE DRAWINGS

These and other features of the invention will appear from the following written description, and from the drawings, in which:

FIG. 4 is a view like FIG. 3, but showing the tracks more widely separated, at the high end of the tolerance range, and showing the slave lock bar closed and the master lock bar closed; and FIG. 5 is a view like FIG. 4, but showing the cross wire after it has lengthened to allow the adjuster mechanism to rotate farther and fully open the master lock bar.

DESCRIPTION OF THE PREFERRED EMBODIMENT

Figure 1:
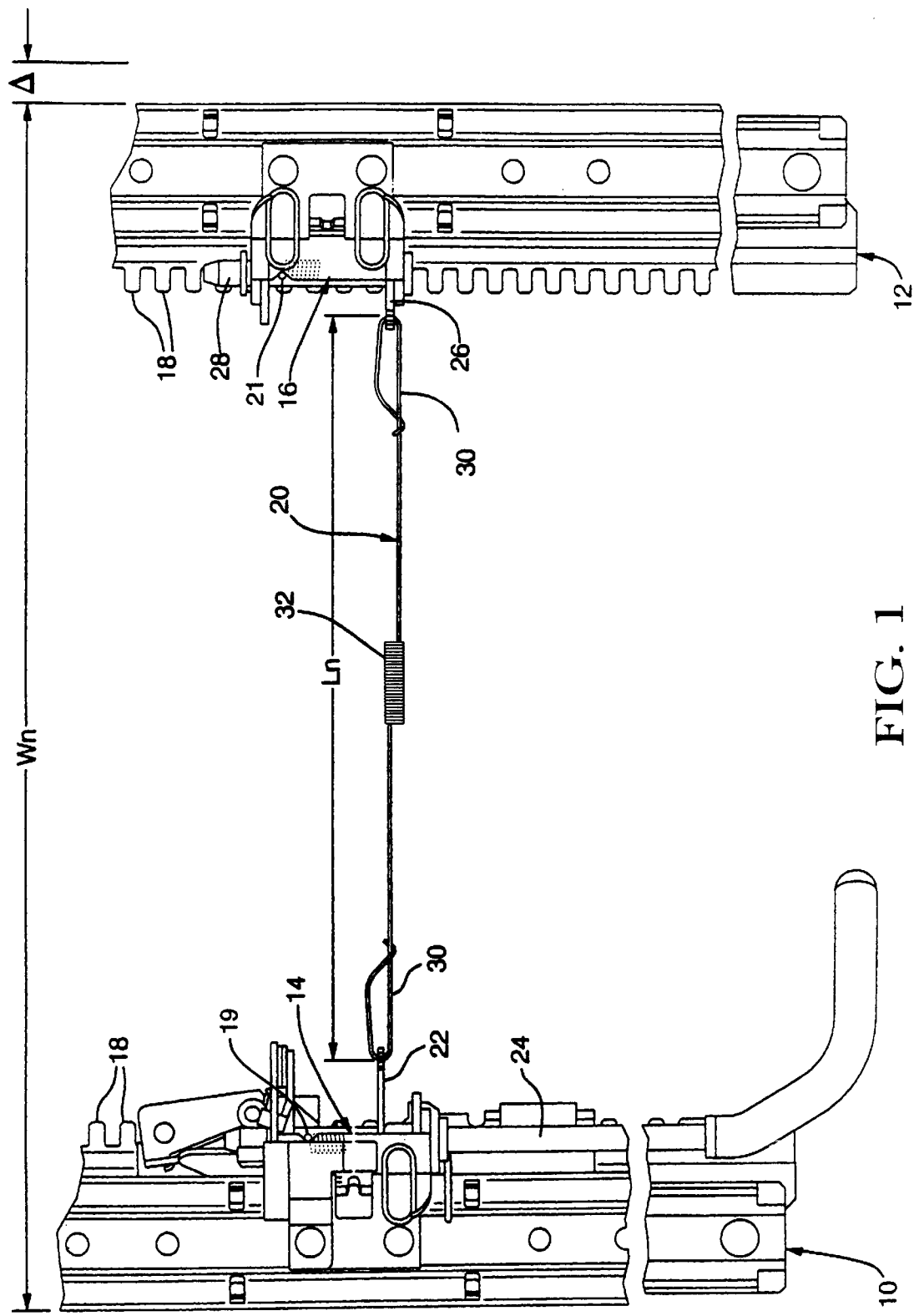
FIG. 1 is a top view of a portion of two conventional seat tracks and opposed master and slave lock bars incorporating a preferred embodiment of the cross wire of the invention.

Referring first to FIG. 1, a vehicle seat adjuster assembly includes a pair of conventional parallel sliding tracks, 10 and 12, to which a standard seat frame would be attached for fore and aft sliding adjustment. The tracks 10 and 12 have a nominal, least separation indicated at Wn, which can vary with normal manufacturing tolerances up to a greatest separation of Wn plus Δ. No particular values need be given, but for any vehicle body, the range of expected tolerance variation would be predictable and known. The tracks 10 and 12 have fixed lower and slidable upper members that are locked together or released by a pair of standard lock bars, a master lock bar indicated generally at 14, and a slave lock bar indicated generally at 16. The basic operation of each lock bar 14 and 16 is to engage teeth 18 on the lower part of the tracks 10 and 12 in a closed position, or to disengage from the teeth 18 in an open position. Torsion springs 19 and 21 provide a continual closing or return force to each lock bar 14 and 16, creating a force which is predetermined and fairly consistent. Further structural details of the two lock bars 14 and 16 are described below. Lock bars of this general type are well known, and disclosed in co assigned U.S. Pat. No. 4,852,846 issued Aug. 1, 1989 to Weier. In general, the master lock bar 14 is operated directly by an adjuster mechanism, typically a manual twist handle. The slave lock bar 16, on the other hand, is indirectly opened and closed by a linking cross wire that runs from the master lock bar 14, operating it passively from, and in tandem with, the directly rotated master lock bar 14. As noted above, a standard, fixed length cross wire cannot be sized so as to allow adequate operation of both lock bars over the entire expected tolerance range of track spacing. If the fixed length cross wire is long enough to allow both lock bars 14 and 16 to fully close under the force of their return springs in a vehicle in which tracks 10 and 12 are widely spaced, it can be too long to allow full opening of the slave lock bar 16 with a narrow track spacing. Conversely, if the fixed length cross wire is short enough to allow full opening of the slave lock bar 16 with a narrow track spacing, then it can be too short to allow full opening of the master lock bar 14 at a wider track spacing. In short, one size cannot fit all, and there is no obvious solution to that dilemma. Even if a "too short" cross wire were made continuously stretchable, either inherently or with the addition of a continuously stretchable coil spring, it could simply begin to stretch before the slave lock bar 16 was fully open, which would not be a viable solution. The invention provides a unique cross wire, a preferred embodiment of which is indicated generally at 20, which stretches only when needed, and not continuously. It has an unstretched fixed length indicated at Ln, which is based on considerations described further below.

Figure 2:
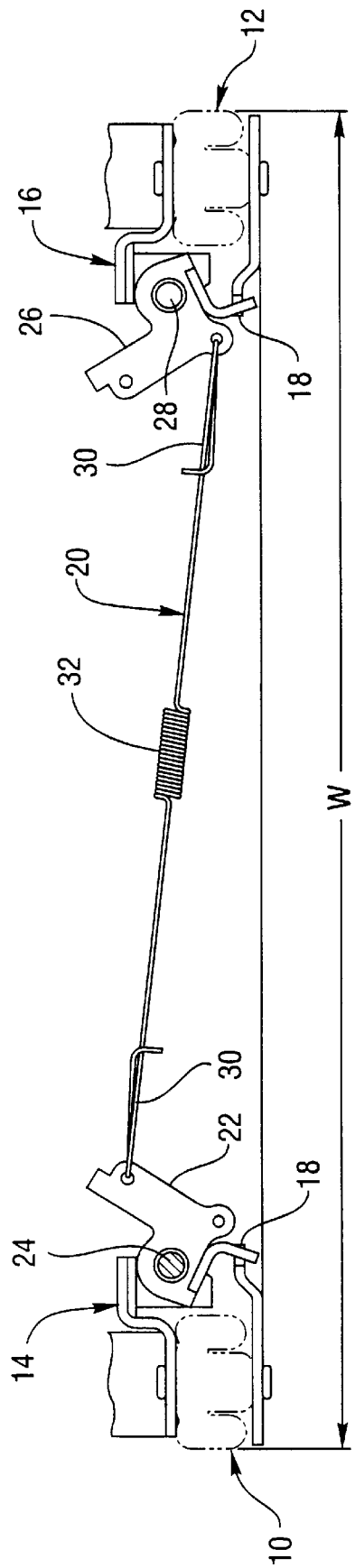
FIG. 2 is a sectional view taken along the line 2—2 of FIG. 1 showing the tracks at any possible spacing within the tolerance range, and showing both lock bars closed with the cross wire in its unstretched condition.

Referring next to FIG. 2, the tracks 10 and 12 are shown with a separation W that may fall anywhere within the expected tolerance range. The master lock bar 14 has a lock bar lever 22, which engages with the teeth 18 of track 10 in the downwardly rotated, fully closed position shown, or disengages when rotated up and open. Lock bar lever 22 is directly rotated by a central shaft 24 to which it is keyed, and shaft 24 is rotated by a conventional manually operated twist handle, not illustrated. As noted above, when the handle is released, coil spring 19 quickly and forcefully returns both lock bar lever 22 and the handle to the down, closed position. In addition, the master lock bar lever 22 may also be operated by a so called "easy entry" mechanism independently of manual twist handle, upon forward pivoting of the seat back. In either case, the slave lock bar 16 is indirectly operated by the cross wire 20. Specifically, slave lock bar 16 has a lock bar lever 26 that is essentially the mirror image of the opposed master lock bar lever 22, and which engages and disengages with the teeth 18 of track 12 in the same way. However, slave lock bar lever 26 freely pivots on a central shaft 28, rather than being keyed thereto. Slave lock bar lever 26 also has a torsion return spring 21 which, when fully opened, provides a predictable return force, in this case, about 37 Newtons. It requires much less force, of course, only about 7 Newtons, to begin to rotate the slave lock bar lever 26 up from the fully closed position shown. Cross wire 20 has identical "solid" (but hooked) ends 30 that attach to each lock bar lever 22 and 26, in either direction. The center of cross wire 20 is not a simple straight wire, however, but an integral, coil spring 32, which is twisted with a preload or pretension that keeps its coils tightly abutted with one another. Therefore, coil spring 32 has a fixed length and is effectively "solid", as is cross wire 20 as a whole, under normal operation. The preload in coil spring 32 is set to be substantially equal to, or just slightly less than, the fully open spring return force for the slave lock bar 16. This preload, combined with a specifically determined initial length of cross wire 20 (described next), allows the cross wire 20 to operate successfully over the entire spacing tolerance range of the tracks 10 and 12.

Figure 3:
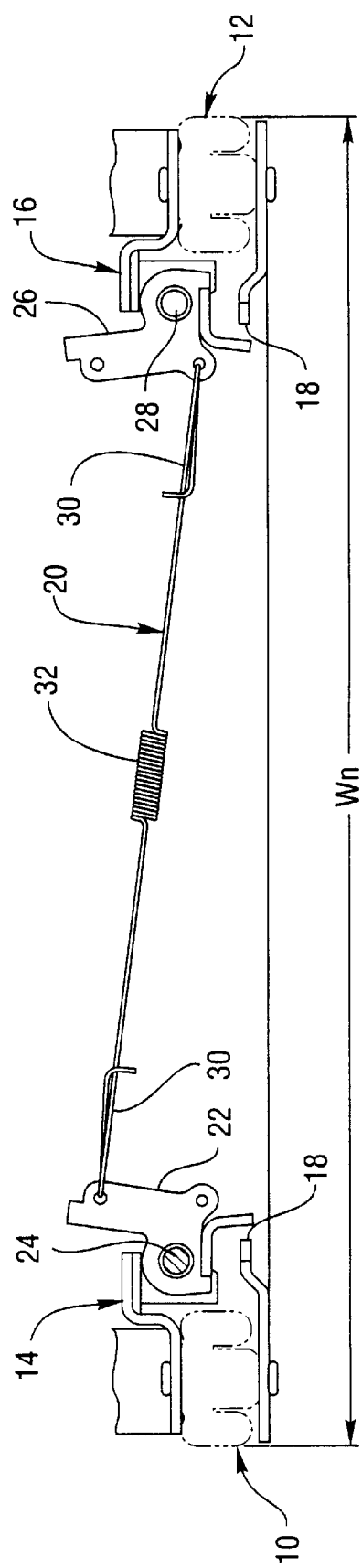
FIG. 3 is a view like FIG. 2, but showing both lock bars fully opened with the track spacing at the low end of the tolerance range.

Referring next to FIGS. 2, 3 and 4, the considerations that go into determining the nominal or "solid" length Ln of cross wire 20 are illustrated. Referring first to FIG. 2, the tracks 10 and 12 are illustrated as being spaced apart by any value within the full possible tolerance range, high, low, or in between. The cross wire 20 nominal length Ln is long enough to assure that the slave lock bar lever 26 is held fully closed by its return spring, and not held partially open by the cross wire 20, at every possible track separation. To assure that required condition, cross wire 20 must in turn be long enough to assure that when the tracks 10 and 12 are spaced apart at or near the high end of the tolerance range, that is, at W plus Δ, it is not under enough tension to pull slave lock bar lever 26 partially up. This may be referred to as the "wide build" condition. If that is true, then cross wire 20 in fact may be long enough to be somewhat relaxed when the tracks 10 and 12 are spaced at the low end of the tolerance range, the so called "narrow build" condition (although it is unlikely that it would be so long as to be visibly relaxed or buckled). However, at narrow build, the cross wire 20 must still be short enough to assure that, when the master lock bar lever 22 is rotated fully up and open, the slave lock bar lever 26 follows suit, and does not lag behind. In actual fact, what the designer does to assure successful and complete "narrow build" opening of the slave lock bar 14 is not to assure that the cross wire 20 is "also short enough". Rather, working with the nominal length Ln just described, the designer assures that the master lock bar lever 22 has enough lever arm and enough "throw" (enough rotation of the twist handle and keyed shaft 24) to open quickly enough and far enough to pull the slave lock bar lever 26 open as the master lock bar 22 opens. Therefore, relatively speaking, the cross wire is "long enough" for wide build closing, and "short enough" for narrow build opening, even though it has only one, fixed or solid length. However, as seen in FIG. 4, what a cross wire having such a fixed length cannot do is assure successful wide build opening. Thus, as seen in FIG. 4, at wide build, a cross wire like 20 with a truly fixed length of Ln can pull the slave lock bar lever 26 fully open before the handle and shaft 24 have rotated enough to fully open the master lock bar lever 22. This is where the dilemma noted above shows up.

Referring next to FIGS. 4 and 5, the cross wire 20 operates to allow successful wide build opening, by stretching slightly, but only when needed, so as not to jeopardize operation under any other conditions. Starting from the FIG.

4 position, the operator of the seat adjuster would sense that the seat tracks 10 and 12 were not both fully unlatched, as indicated by an inability to scoot the seat frame back and forth. The operator would rotate the twist handle and the keyed shaft 24 farther at that point. The operator would not know or care, of course, that the slave lock bar 16 was already fully open, or that the cross wire 20 had reached the limit of its solid length. At that point, the return spring of the fully rotated slave lock bar lever 26 is applying its full hold open force and tension to the cross wire 20, thereby at least equaling, or even beginning to exceed, the preload threshold of the coil spring 32. This allows the coil spring 32 to stretch, allowing the cross wire 20 to effectively lengthen as well. Consequently, the additional rotation that the operator will naturally apply to the twist handle and shaft 24 will translate into additional rotation of the master lock bar lever 22, allowing it to disengage from the teeth 18 of track 10, but will not translate into overstressing an already bottomed out, solid cross wire. When the handle is released, the coil spring 32 retracts, cross wire 20 returns to its initial, solid length, and both lock bar levers 22 and 26 rotate fully closed under the force of their respective return springs.

To summarize the operation, the cross wire 20 of the invention, given the initial length Ln and the preload in coil spring 32 as described above, operates like a conventional, fixed length cross wire to allow full closing at any track spacing all the way to the upper end of the tolerance range (FIG. 2). It also allows full opening at the low end of the tolerance range (FIG. 3), but can effectively lengthen at the point, but only at the point, that it becomes necessary (FIG. 4) to allow stress free full opening at wide build (FIG. 5). Variations in the embodiment disclosed could be made. Any central preload means that held the two ends of the cross wire at the fixed length Ln up to the point when the preload threshold was exceeded would work. This could conceivably be a structure other than a tensioned coil spring like 32. A compression coil spring or other compression device that was cross hooked at opposite ends, and thereby compressed when the cross wire itself was in tension, could work in the same basic fashion, so long as it began to compress only when the same threshold was reached. A separate, short coil spring, sized and pretensioned like coil spring like 32, and hooked at its two ends to a pair of solid wires, could be given the same overall length as cross wire 20. While a three piece cross wire with separate center coil spring would involve more assembly steps, it could allow center coils of different preloads to be substituted. In terms of part reduction, cross wire 20 with its integral coil spring 32 offers the simplest embodiment. Therefore, it will be understood that it is not intended to limit the invention to just the embodiment disclosed.

We claim:

1. A seat adjuster assembly for a vehicle seat having a pair of substantially parallel seat tracks having a spacing that varies within a known manufacturing tolerance range from a nominal, least value to a greatest value, and in which a master lock bar associated with one track is operated directly by an adjuster mechanism that rotates said master lock bar between closed and open positions while a slave lock bar associated with the other track rotates simultaneously between closed and open positions in tandem with the master lock bar, and in which the slave lock bar has a resilient return spring that produces a predetermined return force when fully opened, and a means for connecting said master and slave lock bars that compensates for the tolerance variation in said track spacing, comprising, a cross wire having solid end portions connecting to respective ones of said lock bars and a central, fixed length preload means interconnecting said cross wire ends, said preload means being pretensioned sufficiently so as to maintain its fixed length until a threshold level of tension is applied thereto substantially equal to said predetermined slave lock bar return force, said cross wire having an initial, end to end length sufficiently long to allow both of said lock bars to remain substantially fully closed when said tracks are spaced at the high end of said tolerance range but short enough to pull said slave lock bar fully open when said tracks are spaced at the low end of said tolerance range, and, therefore, also short enough, when said tracks are spaced at the high end of said tolerance range, to pull said slave lock bar fully open when said adjuster mechanism has only partially opened the master lock bar, whereby, when said tracks are spaced at or near the low end of said tolerance range, said cross wire will open said slave lock bar without lengthening, and when said tracks are spaced at or near the high end of said tolerance range, said threshold level of tension will be exceeded when said slave lock bar is fully opened, allowing said central preload means to lengthen and thereby allowing said adjuster mechanism to rotate the master lock bar fully without overstressing said cross wire.

2. A seat adjuster assembly for a vehicle seat having a pair of substantially parallel seat tracks having a spacing that varies within a known manufacturing tolerance range from a nominal, least value to a greatest value, and in which a master lock bar associated with one track is operated directly by an adjuster mechanism that rotates said master lock bar between closed and open positions while a slave lock bar associated with the other track rotates simultaneously between closed and open positions in tandem with the master lock bar, and in which the slave lock bar has a resilient return spring that produces a predetermined return force when fully opened, and a means for connecting said master and slave lock bars that compensates for the tolerance variation in said track spacing, comprising, a cross wire having solid end portions connecting to respective ones of said lock bars and a central coil spring interconnecting said cross wire ends, said coil spring being pretensioned sufficiently so as to maintain its coils in a solid, unstretched condition until a threshold level of tension is applied thereto substantially equal to said predetermined slave lock bar return force, said cross wire having an unstretched, end to end length sufficiently long to allow both of said lock bars to remain substantially fully closed when said tracks are spaced at the high end of said tolerance range but short enough to pull said slave lock bar fully open when said tracks are spaced at the low end of said tolerance range, and, therefore, also short enough, when said tracks are spaced at the high end of said tolerance range, to pull said slave lock bar fully open when said adjuster mechanism has only partially opened the master lock bar, whereby, when said tracks are spaced at or near the low end of said tolerance range, said cross wire will open said slave lock bar without stretching, and when said tracks are spaced at or near the high end of said tolerance range, said threshold level of tension will be exceeded when said slave lock bar is fully opened, allowing said coil spring to stretch and thereby allowing said adjuster mechanism to rotate the master lock bar fully without overstressing said cross wire.

3. A seat adjuster assembly according to claim 2, in which said central coil spring is integrally formed with the solid ends of said cross wire.

* * * * *